United States Patent [19]

Runner

[11] Patent Number: 5,250,802
[45] Date of Patent: Oct. 5, 1993

[54] FIBER OPTIC STRESS SENSOR FOR STRUCTURAL JOINTS

[75] Inventor: Jack A. Runner, San Diego, Calif.

[73] Assignee: Teledyne Ryan Aeronautical, Division of Teledyne Industries, Inc., San Diego, Calif.

[21] Appl. No.: 787,688

[22] Filed: Nov. 4, 1991

[51] Int. Cl.$^5$ .............................................. H01J 5/16
[52] U.S. Cl. .................................. 250/227.15; 73/800
[58] Field of Search .................. 250/227.15, 227.16; 340/550, 555, 556, 557; 73/800; 359/315; 385/8

[56] References Cited

U.S. PATENT DOCUMENTS

| | | | |
|---|---|---|---|
| 4,358,678 | 11/1982 | Lawerence | 250/227 |
| 4,581,527 | 4/1986 | Crane et al. | 250/227 |
| 4,603,252 | 6/1986 | Malek et al. | 250/227 |
| 4,654,520 | 3/1987 | Griffiths | 250/227 |
| 4,692,610 | 9/1987 | Szuchy | 250/227 |
| 4,930,852 | 6/1990 | Wheeler et al. | 359/315 |
| 4,936,649 | 6/1990 | Lymer et al. | 350/96.29 |
| 5,044,205 | 9/1991 | Wolff et al. | 250/227.14 |

Primary Examiner—David C. Nelms
Assistant Examiner—T. Davenport
Attorney, Agent, or Firm—Brown, Martin, Haller & McClain

[57] ABSTRACT

A system for monitoring strain in structural joints has one or more optical fibers embedded in the joint between the structural members. The joint may be fastened using fasteners such as rivets or bonded using an adhesive. Strain on the joined members is transmitted to the fiber, deforming it. An optical reflectometer connected to one end of the fiber injects an optical signal into the fiber and detects the reflection of the signal. The time period between injection of the signal and detection of the reflection is used to localize the area of stress along the fiber.

13 Claims, 2 Drawing Sheets

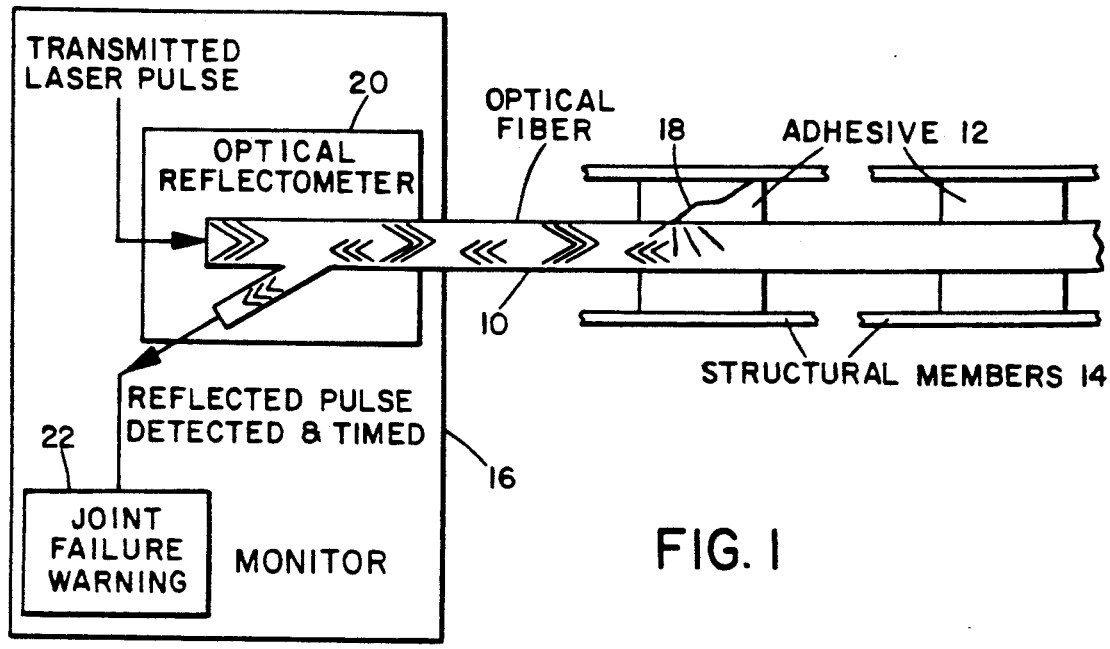
FIG. 1
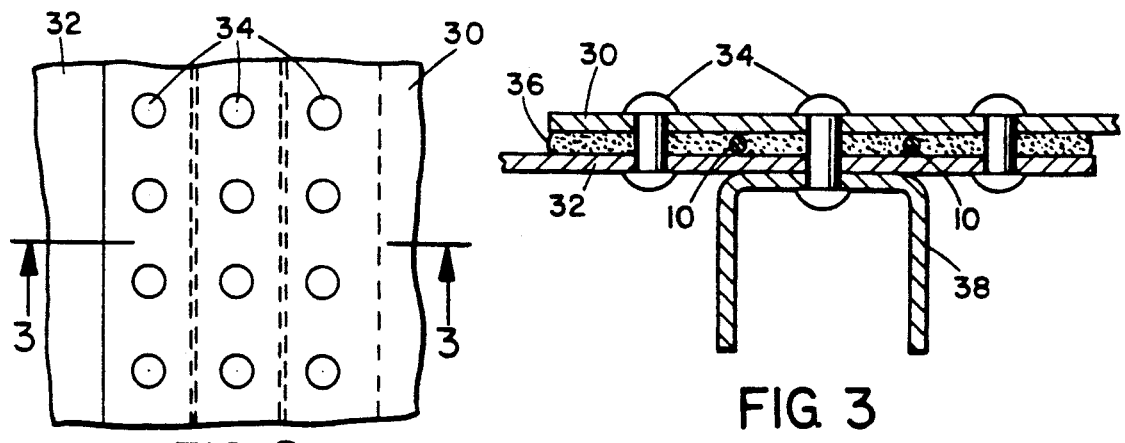
FIG. 2
FIG. 3
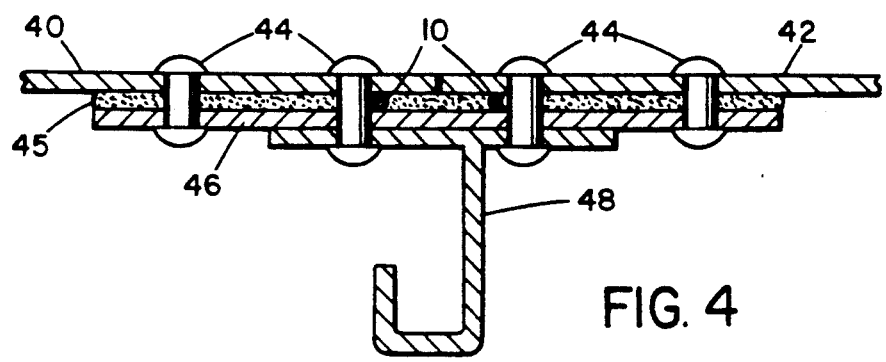
FIG. 4

FIBER OPTIC STRESS SENSOR FOR STRUCTURAL JOINTS

BACKGROUND OF THE INVENTION

The present invention relates to a system for sensing stress or damage in structural joints using fiber optic sensors.

The transmissivity of an optical fiber is maximized when the fiber is perfectly straight. Light is propagated through the fiber core by total internal reflection from the core/cladding boundary. When an optical fiber is bent, a portion of the light is refracted into the cladding and lost. The losses attributable to bending of the fiber measurably attenuate an optical signal transmitted from one end of the fiber to the other. This attenuation increases with an increase in the curvature of the bend. Sensitive photodetectors can detect minute changes in the intensity of light received from an optical fiber.

Practitioners in the art have developed fiber optic strain sensors that introduce light at one end of an optical fiber and detect changes in light intensity at the other end. The intensity varies in response to changes in curvature of the fiber caused by movement of the structure to which the fiber is attached. Mathematical relationships that relate the intensity change to the strain on the structure are known in the art.

Strain and movement can not only be detected but the location of the movement can be determined. U.S. Pat. No. 4,654,520 issued to Griffiths discloses a fiber optic system for continuously monitoring structural movement or stress. In the Griffiths system, a length of optical fiber is placed along a structure such as a pipeline. An optical signal is injected into one end of the pipeline. A detector at the same end is used to receive a reflection of the signal. The time period between injection of the signal and detection of its reflection can be used to determine the location of the anomaly along the fiber.

U.S. Pat. No. 4,692,610 issued to Szuchy discloses a system for monitoring structural strain. Szuchy mounts curved or serpentine sections of optical fiber on a flat surface of the structure. An optical time-domain reflectometer injects light pulses into the fiber and receives reflections. Variations in intensity of received light indicate strain on the structure. The fiber optic sensors of Szuchy have a sharp curvature to enhance detection of strain.

Other fiber optic sensor systems have been developed for detecting and locating structural damage. U.S. Pat. No. 4,581,527 issued to Crane et al. discloses a grid of optical fibers embedded in a plastic composite structure. A detection of light interruption or severe attenuation indicates damaged or highly stressed fibers.

The most highly stressed areas of aircraft structures are the structural joints. Joints may be bonded using a resin adhesive or may be fastened using a suitable fastener. Bonded joints between composite parts are especially susceptible to undetected damage, including cracking of the adhesive. These joints are often located in sealed, uninspectable areas of an aircraft structure. Critical joints may sustain damage that is uninspectable in normal use. Current practice requires that a structure suspected of having a failed joint be removed from service pending evaluation at a maintenance facility.

A fiber optic sensor can be incorporated into a joint by placing it between the structural members joined. Changes in reflections of an injected optical signal would indicate a discontinuity in the fiber caused by strain or damage to the joint. Practitioners in the art have not incorporated fiber optic strain monitoring systems into individual structural joints. Such a system would provide an economical and highly reliable method of monitoring these critical and often uninspectable areas without removing the aircraft from service. Theses problems and deficiencies are clearly felt in the art and are solved by the present invention in the manner described below.

SUMMARY OF THE INVENTION

The present invention comprises one or more optical fibers that are placed between structural members at the time they are joined. Alternatively, a fiber may be adjacent to the joint at a later time and a portion of the fiber secured to each member. The joint may be fastened using fasteners such as rivets or bonded using an adhesive. The present invention is especially useful for monitoring the integrity of bonded joints between composite parts, although it may also be used to monitor fastened joints. In a bonded joints, the fibers may be embedded in the adhesive that joins the members. In an aircraft, fastened joints typically have a sealant or adhesive layer between the members to be joined. The fibers are embedded in this layer to inhibit fiber movement in the absence of stress.

Strain on the joined members is transmitted to the fiber, deforming it. The deformation creates a discontinuity in the light transmission properties of the fiber. The discontinuity can be detected by injecting an optical signal into the fiber and receiving the reflection of the signal. The strength of the reflection signal is proportional to the strain on the fiber.

In a fastened joint, the fiber may be placed between the structural members at points near the fasteners. A plurality of fasteners are often used to r123 provide redundancy. In such a joint, the fiber may run in a straight line from fastener to fastener or may have one or more bends between adjacent fasteners to increase sensitivity to longitudinal movement of the members.

The stress on an aircraft fuselage is transmitted to the points at which the skin sheets are joined. Several joint configurations are known for fastening skin sheets. In a butt splice, two abutting skin sheets are fastened to a reinforcing member, which is fastened to a stiffener member. The fibers of the present invention may be embedded between the skin sheets and the reinforcing member. In a longitudinal skin splice, overlapping skin sheets are fastened together. The overlapping sheets are also fastened to a reinforcing member or stiffener on the fuselage. The fibers of the present invention may be embedded between the overlapping skin sheets and the reinforcing member.

Although, the fibers are preferably embedded in the joint during fabrication, they may be added to existing aircraft. To retrofit an aircraft with the monitoring system of the present invention, the fibers may be disposed parallel to the joint between the skin and the stiffener and secured using a suitable adhesive or sealant. Alternatively, the fibers may be disposed perpendicularly to the joint and a portion of each fiber second to each member.

An optical reflectometer is connected to one end of each fiber. The reflectometer injects an optical signal into the fiber and detects the reflection of the signal. The time period between injection of the signal and detection of the reflection may be measured and used to localize the area of stress along the fiber. The absence of a detectable reflection or the detection of a reflection from the opposite end of the fiber indicates that no joints through which the fiber extends are experiencing substantial stress. A strong reflection indicates that one or more joints are experiencing substantial stress.

BRIEF DESCRIPTION OF THE DRAWINGS

The foregoing, together with other features and advantages of the present invention, will become more apparent when referring to the following detailed description in which reference numerals refer to the drawings in which:

FIG. 1 illustrates, schematically, the joint monitoring system of the present invention;

FIG. 2 is a plan view of a typical overlapped skin joint secured with rivets and incorporating the optical fiber sensors;

FIG. 3 is an enlarged sectional view taken along line 3—3 of FIG. 2;

FIG. 4 is a similar sectional view showing a butt-type joint;

DESCRIPTION OF THE PREFERRED EMBODIMENTS

Figure 5:
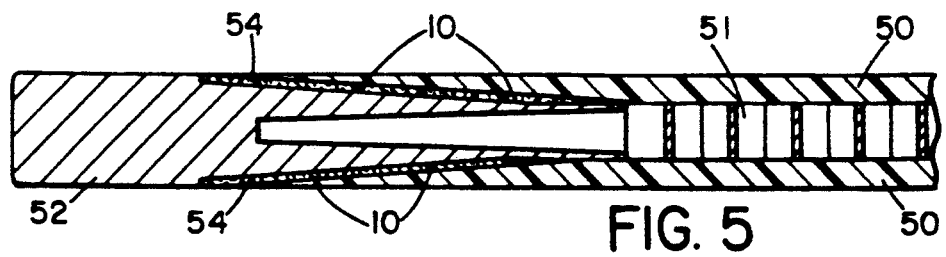
FIG. 5 is a sectional view of a scarf-type edge joint of a composite panel incorporating the optical fiber sensors.

The present invention comprises one or more optical fibers embedded in the joints between structural members and a monitoring device for injecting an optical signal into the fiber and detecting reflections of the signal. In FIG. 1, a fiber 10 is embedded in the adhesive 12 joining structural members 14, which are preferably of a composite material. A monitoring device 16 connected to one end of fiber 10 injects an optical signal such as a laser pulse through an optical reflectometer 20 into fiber 10. The pulse travels along fiber 10, which is disposed within one or more adhesive joints. A crack 18 in an adhesive joint 12 exerts strain on fiber 10 and creates a discontinuity in its transmissivity. The discontinuity partially reflects the pulse. Although a crack is shown, any significant strain transmitted to fiber 10 through adhesive 12 will cause a detectable reflection. Therefore, the present invention may also be incorporated into a joint having a more resilient adhesive that is not susceptible to cracking.

The reflection returns to optical reflectometer 20, which measures the strength of the reflected pulse and the transit time between injection of the signal and detection of its reflection. If the reflected signal strength exceeds a predetermined threshold, a warning 22 is issued. Furthermore, the measured time can be used to calculate the location of the discontinuity of fiber 10 because the speed of the optical signal in a fiber of a particular composition can be predetermined. Joint failure warning 22 may be any suitable aural or visual indication that alerts the flight crew or maintenance personnel to a potentially unsafe condition.

In FIGS. 2 and 3, an overlapping skin joint comprises skin sheets 30 and 32 secured with rivets 34 and an adhesive or sealant layer 36 in which one or more fibers 10 are embedded. The skin sheets are also secured to a structural member or stiffener 38. Failure of one or more rivets 34 allows skin sheets 30 and 32 to move relative to each other and member 38. Such movement exerts strain on fibers 10. Monitoring device 16, which is connected to fibers 10, detects the strain and provides a warning as described above.

In FIG. 4, a butt joint comprises two skin sheets 40 and 42 secured with rivets 44 and an adhesive or sealant layer 45 in which one or more fibers 10 are embedded. A reinforcing member 46 and a stiffener or structural member 48 back the joint. Failure of rivets 44 allows relative movement between sheets 40 and 42. The movement exerts strain on fibers 10, which is detected by monitoring device 16 as described above.

Figure 6:
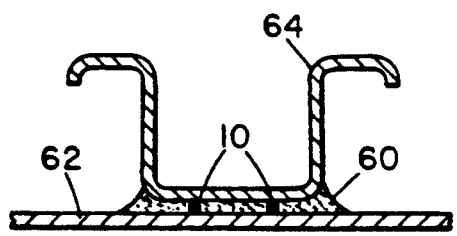
FIG. 6 is a sectional view of a stiffener-to-skin joint incorporating optical fiber sensors embedded in the adhesive.
Figure 10:
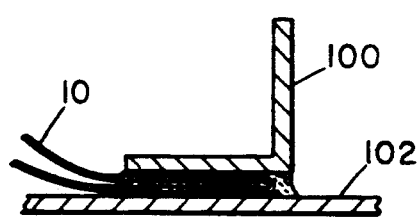
FIG. 10 is a sectional view showing an optical fiber embedded in a joint.

In FIG. 5, composite skin sheets 50 covering a core 51 are joined to an attachment fitting 52. At the time fitting 52 is attached to the structure being fabricated, fibers 10 are embedded in an adhesive or sealant layer 54 between skin sheets 50 and attachment fitting 52. FIG. 6 shows an adhesive joint such as those shown schematically in FIG. 1. Fibers 10 are embedded in adhesive 60 that joins structural members such as a skin sheet 62 and a stringer 64. Fiber 10 is parallel to the length of the joint. In FIG. 10, a similar adhesive joint comprises a loop of fiber 10 embedded in adhesive 101 joining aircraft frame member 100 and skin sheet 102.

Figure 7:
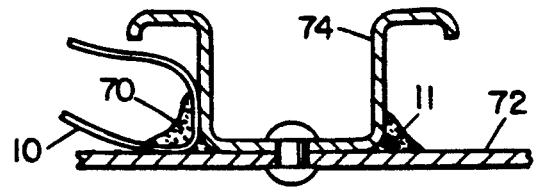
FIG. 7 is a similar view with the stiffener secured by a fastener and the optical fibers attached externally.

Existing aircraft may be retrofitted with the present invention. In FIG. 7, fiber 10 is disposed perpendicularly to the joint and embedded in a small amount of a suitable adhesive 70 that secures it to skin sheet 72 and stringer 74. Alternatively, a fiber such as fiber 11 may be disposed parallel to the joint and embedded in a bead of adhesive that runs along the length of the joint. Although FIG. 7 shows a riveted joint, an adhesive joint such as that shown in FIG. 6 may be retrofitted with the present invention in a like manner.

Figure 8:
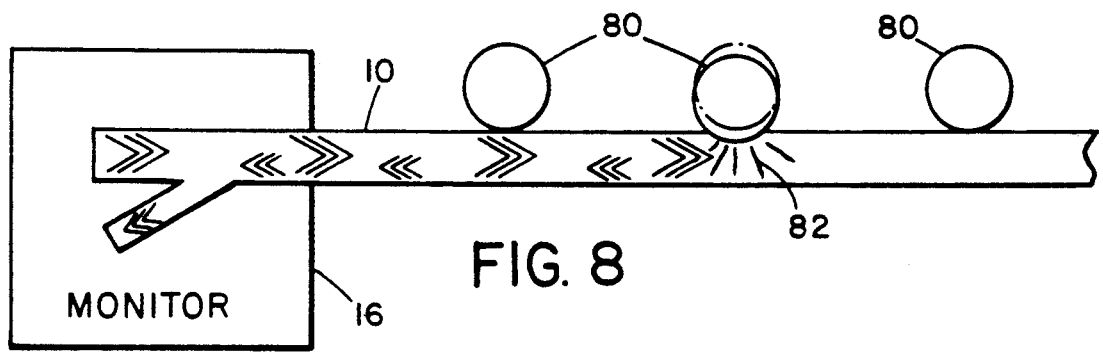
FIG. 8 is similar to FIG. 1 but shows fasteners instead of adhesive.
Figure 9:
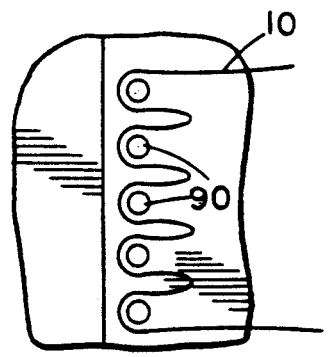
FIG. 9 is a plan view of a joint having a plurality of fasteners, each having an optical fiber sensor.
Figure 11:
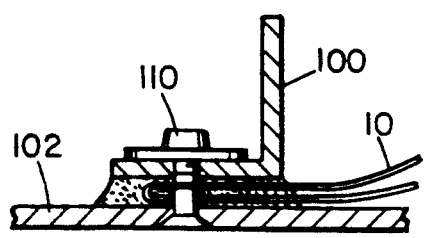
FIG. 11 is a similar view with an added fastener.

In FIG. 8, fiber 10 runs adjacent to a plurality of fasteners 80. Displacement of a fastener 80 creates a discontinuity 82 similar to that created by a crack in an adhesive joint. Monitoring device 16 detects the reflection caused by discontinuity 82 as described above. As shown in FIG. 9, fiber 10 may be disposed in a zigzag or serpentine fashion between fasteners 90. Fiber 10 should be placed directly beneath the fastener head, if possible. In FIG. 11, fiber 10 is looped around the fastener directly beneath the fastener head 110 to maximize sensitivity to strain.

Figure 12:
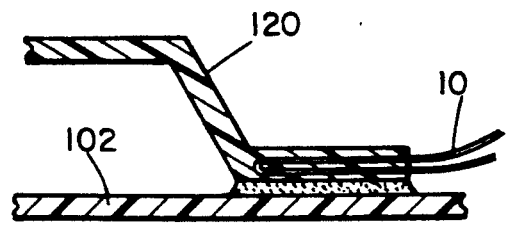
FIG. 12 is a sectional view showing an optical fiber embedded in a composite structural element.

In FIG. 12, fiber 10 is incorporated into a composite stiffener 120 during fabrication of the stiffener. Stiffener 120 and integral fiber 10 are then fastened to the aircraft skin 102. Separation of stiffener 120 from skin 102 due to joint failure would move fiber 10 and create a detectable change in the reflected signal.

Monitoring device 16 may remain aboard the aircraft and connected to the fibers for continuously interrogating them while the aircraft is in operation. Alternatively, the fibers may be terminated in a suitable connector on the aircraft and monitoring device 16 periodically connected at scheduled maintenance intervals. In either situation, the present invention provides a method for monitoring uninspectable damage to critical aircraft joints.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. A method for monitoring the structural integrity of a joint between a first substantially rigid structural member and a second substantially rigid structural member, said first structural member having a first surface and said second structural member having a second surface substantially parallel to said first surface, said joint having an adhesive between said surfaces for joining said structural members, comprising the steps of:
   disposing a portion of an optical fiber between said surfaces and embedded in said adhesive, said fiber not penetrating said surfaces, said fiber having an end;
   injecting an optical signal into said end of said optical fiber;
   detecting a reflection of said optical signal at said end of said fiber, said reflection having a transit time; and
   providing a strain detection signal in response to said detection of said reflection.

2. A method for monitoring the structural integrity of a joint as described in claim 1, wherein said disposing step further comprises the step of:
   forming a loop in said fiber portion.

3. A method for monitoring the structural integrity of a joint as described in claim 1, further comprising the steps of:
   measuring said transit time; and
   providing an indication of strain location in response to said transit time.

4. A method for monitoring the structural integrity of a joint as described in claim 1, wherein said first surface is an aircraft skin and said second surface is an aircraft structural member.

5. A method for monitoring the structural integrity of a joint as described in claim 1, wherein said first surface is an aircraft skin and said second surface is an attachment point.

6. A method for monitoring the structural integrity of a joint between a first substantially rigid structural member and a second substantially rigid structural member, said first structural member having a first surface and said second structural member having a second surface substantially parallel to said first surface, said joint having at least one fastener for connecting said structural members, comprising the steps of:
   disposing an optical fiber between said surfaces and adjacent to said fastener, said fiber not penetrating said surfaces, said fiber having an end;
   injecting an optical signal into said end of said fiber;
   detecting a reflection of said optical signal at said end of said fiber, said reflection having a transit time; and
   providing a strain detection signal in response to said detection of said reflection.

7. A method for monitoring the structural integrity of a joint as described in claim 6, wherein said disposing step further comprises the step of:
   looping said fiber around said fastener.

8. A method for monitoring the structural integrity of a joint as described in claim 6, wherein said first surface is an aircraft skin and said second surface is an aircraft structural member.

9. A method for monitoring the structural integrity of a joint as described in claim 6, wherein said first and second surfaces are aircraft skin sheets.

10. A method for monitoring the structural integrity of a joint as described in claim 6, further comprising the steps of:
    measuring said transit time; and
    providing an indication of strain location in response to said transit time.

11. A method for monitoring the structural integrity of a joint as described in claim 6, wherein said disposing step further comprises embedding said fiber in an adhesive resin.

12. A method for monitoring the structural integrity of a joint, comprising the steps of:
    forming a composite member having an embedded optical fiber;
    forming an adhesive bond between said composite member having said loop and a second composite member, said bond adjacent to a portion of said fiber;
    injecting an optical signal into said fiber;
    detecting a reflection of said optical signal, said reflection having a transit time; and
    providing a strain detection signal in response to said detection of said reflection.

13. A method for monitoring the structural integrity of a joint as described in claim 12, further comprising the steps of:
    measuring said transit time; and
    providing an indication of strain location in response to said transit time.

* * * * *